United States Patent
Piggott et al.

(10) Patent No.: US 11,944,070 B2
(45) Date of Patent: Apr. 2, 2024

(54) APPARATUS AND METHOD FOR CONTROLLING ANIMAL POSITIONS

(71) Applicant: HALTER USA INC, San Francisco, CA (US)

(72) Inventors: Craig Piggott, Auckland (NZ); Chris Bloomfield, Auckland (NZ)

(73) Assignee: HALTER USA INC, San Francisco, CA (US)

( * ) Notice: Subject to any disclaimer, the term of this patent is extended or adjusted under 35 U.S.C. 154(b) by 34 days.

(21) Appl. No.: 16/981,989

(22) PCT Filed: Mar. 19, 2019

(86) PCT No.: PCT/IB2019/052240
§ 371 (c)(1),
(2) Date: Sep. 17, 2020

(87) PCT Pub. No.: WO2019/180623
PCT Pub. Date: Sep. 26, 2019

(65) Prior Publication Data
US 2021/0112776 A1    Apr. 22, 2021

(30) Foreign Application Priority Data
Mar. 19, 2018   (NZ) ........................................ 740871

(51) Int. Cl.
*A01K 15/02*    (2006.01)
*A01K 27/00*    (2006.01)
(Continued)

(52) U.S. Cl.
CPC .......... *A01K 27/009* (2013.01); *A01K 15/023* (2013.01); *A01K 27/001* (2013.01);
(Continued)

(58) Field of Classification Search
CPC ............................ A01K 15/023; A01K 29/005
See application file for complete search history.

(56) References Cited

U.S. PATENT DOCUMENTS

| 4,898,120 A | * | 2/1990 | Brose ................... A01K 15/023 119/908 |
| 5,610,588 A | | 3/1997 | Yarnall, Jr. et al. |

(Continued)

FOREIGN PATENT DOCUMENTS

| AU | 2012271685 A1 * | 1/2014 | .......... A01K 15/023 |
| AU | 2018223232 A1 | 8/2019 | |

(Continued)

OTHER PUBLICATIONS

International Search Report and Written Opinon of International Search Authority for International Application No. PCT/IB2019/052240.

(Continued)

*Primary Examiner* — Monica L Perry
*Assistant Examiner* — Alanna K Peterson
(74) *Attorney, Agent, or Firm* — JCIP; Joseph G. Chu; Jeremy I. Maynard

(57) ABSTRACT

An apparatus (200) for controlling an animal or animal positions by applying one or more form of stimulus is disclosed. The apparatus (200) comprises at least one position sensing device (240) that is configured to detect at least one position of at least part of the animal as at least one position value. At least one controller (210) is operatively connected to at least one position sensing device (140). The controller (210) is programmed to read and compare the at least one position value with at least one predetermined value relating to the at least one position for determining if at least one control action is required. The control action relates to transmitting of at least one control signal to the (Continued)

stimulus device (250) to administer at least one form of stimulus to the animal that is able to be sensed by the animal.

15 Claims, 7 Drawing Sheets

(51) Int. Cl.
*A01K 29/00* (2006.01)
*H02S 10/40* (2014.01)
*H02S 20/30* (2014.01)
*H02S 40/38* (2014.01)
*A01K 11/00* (2006.01)
*H02J 7/35* (2006.01)

(52) U.S. Cl.
CPC ............ *A01K 29/005* (2013.01); *H02S 10/40* (2014.12); *H02S 20/30* (2014.12); *H02S 40/38* (2014.12); *A01K 11/008* (2013.01); *H02J 7/35* (2013.01)

(56) References Cited

U.S. PATENT DOCUMENTS

| | | | |
|---|---|---|---|
| 5,868,100 | A | 2/1999 | Marsh |
| 6,581,546 | B1 | 6/2003 | Dalland et al. |
| 6,700,492 | B2 | 3/2004 | Touchton et al. |
| 7,814,865 | B2* | 10/2010 | Tracy .............. A01K 15/023 119/859 |
| 8,939,111 | B2 | 1/2015 | Berntsen |
| 8,955,462 | B1 | 2/2015 | Golden |
| 9,277,734 | B1* | 3/2016 | Paradis .............. A01K 27/009 |
| 9,693,536 | B1 | 7/2017 | Dana |
| 9,848,295 | B1* | 12/2017 | Mason .............. H04W 4/025 |
| D858,903 | S | 9/2019 | Jennings et al. |
| 2004/0108939 | A1 | 6/2004 | Giunta |
| 2006/0011144 | A1 | 1/2006 | Kates |
| 2007/0204804 | A1 | 9/2007 | Swanson et al. |
| 2008/0276879 | A1 | 11/2008 | Marsh |
| 2012/0111286 | A1 | 5/2012 | Lee et al. |
| 2012/0312250 | A1 | 12/2012 | Jesurum |
| 2013/0008391 | A1 | 1/2013 | Berntsen |
| 2013/0157628 | A1* | 6/2013 | Kim .............. A01K 15/04 455/414.1 |
| 2015/0053144 | A1 | 2/2015 | Bianchi et al. |
| 2016/0015004 | A1 | 1/2016 | Bonge, Jr. |
| 2017/0079247 | A1 | 3/2017 | Womble et al. |
| 2017/0135315 | A1 | 5/2017 | Marmen et al. |
| 2017/0208875 | A1 | 7/2017 | Shih |
| 2017/0265432 | A1 | 9/2017 | Anderton et al. |
| 2017/0325426 | A1 | 11/2017 | Brosh et al. |
| 2017/0372580 | A1 | 12/2017 | Vivathana |
| 2019/0373857 | A1 | 12/2019 | Leigh-Lancaster et al. |
| 2019/0387714 | A1 | 12/2019 | Jennings et al. |

FOREIGN PATENT DOCUMENTS

| | | |
|---|---|---|
| AU | 2020200530 B2 | 6/2020 |
| AU | 2019261293 A1 | 12/2020 |
| BR | 112019017678 A2 | 3/2020 |
| CA | 3052216 A1 | 8/2018 |
| CN | 110381734 A | 10/2019 |
| EP | 2515633 A1 | 10/2012 |
| EP | 3585152 A | 1/2020 |
| NL | 9401617 A | 5/1996 |
| NZ | 333654 A | 7/2000 |
| NZ | 505236 A | 11/2002 |
| NZ | 547075 A | 5/2008 |
| NZ | 552437 A | 1/2009 |
| NZ | 578437 A | 6/2012 |
| NZ | 590687 A | 8/2013 |
| NZ | 755839 | 8/2019 |
| WO | 0104858 A1 | 1/2001 |
| WO | 2010009509 A1 | 1/2010 |
| WO | 2011087369 A1 | 7/2011 |
| WO | 2014180783 A1 | 11/2014 |
| WO | 2017087363 A1 | 5/2017 |
| WO | 2018152593 A1 | 8/2018 |
| WO | 2019209712 A1 | 10/2019 |
| WO | 2020047581 A1 | 3/2020 |
| WO | 2021016653 A1 | 2/2021 |

OTHER PUBLICATIONS

International Preliminary Report on Patentability for International Application No. PCT/IB2019/052240.
Extended European Search Report dated Dec. 7, 2021 for European Application No. 19770469.5.
Extended European Search Report dated Oct. 15, 2021 for European Application No. 19770402.6.
D. M. Anderson "Virtual fencing-past, present and future" https://jornada.nmsu.edu/bibliography/07-018.pdf, The Rangeland Journal, pp. 65-78, 2007.

* cited by examiner

APPARATUS AND METHOD FOR CONTROLLING ANIMAL POSITIONS

FIELD OF THE INVENTION

The present invention relates to an apparatus and method for controlling an animal or animal positions. More particularly, but not exclusively, the present invention relates to an apparatus and method for controlling the animal or positions of livestock animals such as dairy cows, buffaloes, sheep etc.

BACKGROUND OF THE INVENTION

Fences for helping keep livestock animals within a desired area for grazing are well known in the art. There are various types of fences such as those that use post fences, barbed wire fences, and electrical fences which are energized with a low level electrical pulse.

Although, such fences do assist in keeping the animals within a defined area and graze within the defined area of the field, they do not allow monitoring of the specific position of one or more animals and behaviour of the animals that are confined within the specific zone and control the animal accordingly. For example, if the animals are left to graze within a confinement zone in a field, they may focus on consuming the pasture on one particular area of the confined zone over another area. In addition, the animals eat different forage species in different ways. Cattle typically tear off large mouthfuls of forage. Some animals such as cows are spotty eaters and avoid areas near manure drops and eat grass down very close to the ground. Goats and sheep bite off plants close to the ground, which may lead to overgrazing and for the remaining parts of grass to be slow at re-growing.

It is desirable to ensure that the pasture grown in a confinement zone is uniformly consumed because if a particular area is overgrazed, then that could negatively affect the re-growth. Further such overgrazing could also lead to erosion problems, especially on slopes. Similarly grass land that is wet may be subject to localised pugging caused by animals. This may be as a result of animals on such land preferring to take shelter from wind in a specific area thereby causing a large number of concentrated hoof steps being taken, causing pugging and hence comprising grass growth in such areas.

Also, it is often desirable to know if the animal is actually grazing or not grazing when left in the field to graze. This can even help to determine the health or physiological status of the animal and/or where the area the animals are in does indeed have enough grass for the animals or whether they have to be moved onto new ground for access to more food.

There are prior art systems that are used to limit the range of movement of an animal to a pre-defined confined space. In typical prior art systems, a system including a receiver (such as radio receiver) is mounted upon an animal in order to detect a signal from a radio transmitter. The system delivers a stimulus to the animal in response to the signal that is received. Devices such as transducers are typically employed in order to apply electric shock and/or an audible stimulus to the animal to either discourage the animal from entering a certain area or to confine the animal within a certain area. For example, this is shown in U.S. Pat. No. 5,610,588.

A problem associated with such prior art systems is that they provide fail to provide any indication of whether the subject animal has responded well to the stimuli. Another problem is that the above described prior art systems do not provide any means for monitoring how a particular animal is behaving especially when the animal is not walking or is within a particular spot of the confined area, and applying the control action accordingly. A further problem is that the above described prior art systems do not provide any means for training a particular animal to remain within a confined area and graze well within the confined area. The prior art electronic animal control systems only provide means for confining an animal to a defined area or for excluding an animal from a defined area. It cannot control or guide the animal movement when the animal is within the confined area.

Thus, there is a need of an apparatus and method for controlling animal positions to help monitor the behaviour of the animal that is or is to be confined within the specific area including within a particular spot of the specific area, and that allows controlling of the animal accordingly.

OBJECT OF THE INVENTION

It is an object of the invention to provide an apparatus and method for controlling animal or animal positions which overcomes or at least partially ameliorates some of the abovementioned disadvantages or which at least provides the public with a useful choice.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprises' or 'comprised' or 'comprising' is used in relation to the apparatus or to one or more steps in a method or process.

As used herein the term "and/or" means "and" or "or", or both.

As used herein "(s)" following a noun means the plural and/or singular forms of the noun.

When used in claim and unless otherwise stated, the word 'for' is to be interpreted to mean only 'suitable for' and not, for example, specifically 'adapted' or 'configured' for the specific purpose that is stated.

Unless otherwise stated, the word 'connected' or 'operatively connected' is to be interpreted to mean connected either physically (such as using electric wires) or wirelessly for allowing electronic communication such connected or operatively connected components.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

BRIEF DESCRIPTION OF THE INVENTION

According to a first aspect, the invention comprises an apparatus for controlling an animal, the apparatus comprising:
  at least one position sensing device configured to detect at least one position of at least part of the animal as at least one position value; and at least one controller that is operatively connected to the at least one position sensing device, and programmed to read and compare the at least one position value with at least one predetermined value relating to the at least one position for determining if at least one control action is required, the at least one control action being transmitting of at least one control signal to at least one stimulus device to administer at least one form of stimulus to an animal that is able to be sensed by the animal, wherein at least the at least one stimulus device is adapted to be carried by the animal.

In one embodiment, the apparatus comprises or is operatively connected to at least one transmitting device adapted to transmit a signal representing the at least one position value (e.g. angular position value and/or location value) from the at least one position sensing device to the at least one controller, and to transmit the at least one control signal to the at least one stimulus device if the at least one controller determines or receives a control command that the control action is required.

In one embodiment, the at least one position is at least one angular position of at least part of the animal.

In one embodiment, the at least one position is at least one angular position relative to a datum or relative to at least read angular position or the at least one position value relating to the angular position.

In one embodiment, the at least one position is at least one angular position relative to a horizontal plane.

In one embodiment, the at least one position is at least one angular heading of the animal.

In one embodiment, the at least one position is the angular position and the at least one angular position is the course of the animal.

In one embodiment, the at least one position is at least one location of at least part of the animal.

In one embodiment, the at least one position is at least one location relative to a datum.

In one embodiment, the at least one position is location relative to a global position.

In one embodiment, the at least one transmitting device is part of the apparatus.

In one embodiment, the at least one transmitting device is a transceiver.

In one embodiment, the at least one controller comprises or is operatively connected to a memory for storing at least the predetermined value.

In one embodiment, the memory is a Random Access Memory (RAM).

In one embodiment, the memory is an Electrically Erasable Programmable Read-Only Memory (EEPROM).

In one embodiment, the angular position is measured in three orthogonal directions, the three orthogonal directions being roll, pitch and yaw.

In one embodiment, the angular position of at least one of the head and the neck of the animal is measured in three orthogonal directions, the three orthogonal directions being roll, pitch and yaw.

In one embodiment, the at least one position sensing device comprises an inertial measurement unit.

In one embodiment, the at least one position sensing device comprises a gyroscope.

In one embodiment, the at least one position sensing device comprises or is operatively connected to at least one navigation means that is operatively connected with the at least one controller, the at least one navigation means being configured to determine a location of at least part of the animal as the at least one position value and transmit a signal representing the at least one position value to the at least one controller.

In one embodiment, the at least one navigation means is or uses a Global Positioning System (GPS) or a Local Positioning System (LPS).

In one embodiment, the at least one navigation means is or uses a Global Positioning System (GPS) and the at least one position value is made up of at least two GPS co-ordinates.

In one embodiment, the at least one stimulus device comprises at least one speaker and the at least one stimulus is in a form of a sound generated by the at least one speaker, the sound being audible to the animal.

In one embodiment, the sound is variable in volume and/or frequency.

In one embodiment the sound is adapted to increase in volume and/or frequency at two or more levels of volume and/or frequency depending on the at least one position.

In one embodiment the sound is adapted to decrease in volume and/or frequency at two or more levels of volume and/or frequency depending on the at least one position.

In one embodiment, the at least one stimulus device comprises at least one vibrator and the at least one stimulus is in a form of a vibration that is able to be sensed by the animal, the vibration being generated by the at least one vibrator.

In one embodiment, the vibration is variable in strength and/or frequency.

In one embodiment the vibration is adapted to increase in strength and/or frequency at two or more levels of strength and/or frequency depending on the at least one position.

In one embodiment the vibration is adapted to decrease in strength and/or frequency at two or more levels of strength and/or frequency depending on the at least one position.

In one embodiment, the at least one stimulus device comprises at least one electrode and the at least one stimulus is an electric shock (electric current) that is able to be sensed by the animal, the electric shock being generated by the at least one electrode.

In one embodiment, the electric shock is variable in magnitude.

In one embodiment the electric shock is adapted to increase in magnitude at two or more levels of magnitude depending on the at least one position.

In one embodiment the electric shock is adapted to decrease magnitude at two or more levels of magnitude depending on the at least one position.

In one embodiment, the at least one controller is operatively connected to a remote processor and is configured to perform the control action on the basis of a command received from at least one of a remote processor and a remote server.

In one embodiment the apparatus further comprises a housing and the at least one stimulus device is attached to the housing or partly located inside the housing.

In one embodiment, the housing is in a form of a collar configured to be worn by the animal.

In one embodiment, the collar is configured to be worn around the neck of the animal.

In one embodiment, the at least one stimulus device comprises two (or at least two) speakers, one speaker being on left side of the collar and other speaker being on right side of the collar, and the at least one stimulus is in a form of a sound generated by at least one of the two (at least two) speakers, the sound being audible to the animal.

In one embodiment, the sound is variable in volume and/or frequency.

In one embodiment the sound is adapted to increase in volume and/or frequency at two or more levels of volume and/or frequency depending on the at least one position.

In one embodiment the sound is adapted to decrease in volume and/or frequency at two or more levels of volume and/or frequency depending on the at least one position.

In one embodiment, the at least one stimulus device comprises two (or at least two) vibrators, one vibrator being on left side of the collar and other vibrator being on right side of the collar, and the at least one stimulus is in a form of a vibration that is able to be sensed by the animal, the vibration being generated by at least one of the two (at least two) vibrators.

In one embodiment, the vibration is variable in strength and/or frequency.

In one embodiment the vibration is adapted to increase in strength and/or frequency at two or more levels of strength and/or frequency depending on the at least one position.

In one embodiment the vibration is adapted to decrease in strength and/or frequency at two or more levels of strength and/or frequency depending on the at least one position.

In one embodiment, the at least one stimulus device comprises two (at least two) electrodes, one electrode being on left side of the collar and other electrode being on right side of the collar, and the at least one stimulus is in a form of an electric shock (electric current) that is able to be sensed by the animal, the electric shock being generated by at least one of the two (at least two) electrodes.

In one embodiment, the electric shock is variable in magnitude.

In one embodiment the electric shock is adapted to increase in magnitude at two or more levels of magnitude depending on the at least one position.

In one embodiment the electric shock is adapted to decrease magnitude at two or more levels of magnitude depending on the at least one position.

According to a second aspect, the invention comprises an apparatus for controlling an animal, the apparatus comprising:
  a housing,
  the housing carrying:
    at least one position sensing device configured to detect at least one position of at least part of the animal as at least one position value, at least one position sensing device being selected from at least one of (a) an angular position sensing device configured to detect at least one angular position of the animal as the at least one position value and (b) a location sensing device configured to detect at least at least one location of the animal as the at least one position value; and
    at least one controller that is operatively connected to the at least one position sensing device, and programmed to read and compare the at least one position value with at least one predetermined position value relating to the at least one position (e.g. angular position and/or location), for determining if a control action is required, the control action being transmitting a control signal to at least one stimulus device thereby causing the at least one stimulus device to administer at least one form of stimulus to the animal,
  wherein the at least one stimulus device is attached to the housing; and
  wherein the housing is adapted to be carried by the animal.

Preferably, the housing comprises or attaches at least one transmitting device adapted to transmit the at least one position value (angular position value and/or location value) from the at least one position sensing device to the at least one controller, and to transmit the at least one control signal to the at least one stimulus device if the at least one controller determines or receives a control command that the control action is required.

In one embodiment, the housing comprises or attaches a memory for storing at least the predetermined value relating to the at least one position.

In one embodiment, the at least one transmitting device is a transceiver.

In one embodiment, the memory is a Random Access Memory (RAM).

In one embodiment, the memory is an Electrically Erasable Programmable Read-Only Memory (EEPROM).

In one embodiment, the at least one angular position is measured in three orthogonal directions, the three orthogonal directions being roll, pitch and yaw.

In one embodiment, the at least one angular position of at least one of the head and the neck of the animal is measured in three orthogonal directions, the three orthogonal directions being roll, pitch and yaw.

In one embodiment, the at least one position sensing device comprises an inertial measurement unit.

In one embodiment, the at least one position sensing device comprises a gyroscope.

In one embodiment, the housing comprises or attaches at least one navigation means that is operatively connected with the at least one controller, the navigation means being configured to determine a location of the animal as the at least one position value and transmit a signal representing the position value to the at least one controller.

In one embodiment, the navigation means is or uses a Global Positioning System (GPS) or a Local Positioning System (LPS).

In one embodiment, the navigation means is or uses a Global Positioning System (GPS) and the at least one position value is made up of at least two GPS co-ordinates.

In one embodiment, the at least one stimulus device comprises at least one speaker and the at least one stimulus is in a form of a sound generated by the at least one speaker, the sound being audible to the animal.

In one embodiment, the sound is variable in volume and/or frequency.

In one embodiment the sound is adapted to increase in volume and/or frequency at two or more levels of volume and/or frequency depending on the at least one position.

In one embodiment the sound is adapted to decrease in volume and/or frequency at two or more levels of volume and/or frequency depending on the at least one position.

In one embodiment, the at least one stimulus device comprises at least one vibrator and the at least one stimulus is in a form of a vibration that is able to be sensed by the animal, the vibration being generated by the at least one vibrator.

In one embodiment, the vibration is variable in strength and/or frequency.

In one embodiment the vibration is adapted to increase in strength and/or frequency at two or more levels of strength and/or frequency depending on the at least one position.

In one embodiment the vibration is adapted to decrease in strength and/or frequency at two or more levels of strength and/or frequency depending on the at least one position.

In one embodiment, the at least one stimulus device comprises at least one electrode and the at least one stimulus is an electric shock (electric current) that is able to be sensed by the animal, the electric shock being generated by the at least one electrode.

In one embodiment, the electric current or the electric shock is variable in magnitude.

In one embodiment the electric shock is adapted to increase in magnitude at two or more levels of magnitude depending on the at least one position.

In one embodiment the electric shock is adapted to decrease magnitude at two or more levels of magnitude depending on the at least one position.

In one embodiment, the apparatus is in a form of a collar configured to be worn around the neck of the animal.

In one embodiment, the at least one stimulus device comprises two (or at least two) speakers, one speaker being on left side of the collar and other speaker being on right side of the collar, and the at least one stimulus is in a form of a sound generated by at least one of the two (at least two) speakers, the sound being audible to the animal.

In one embodiment, the sound is variable in volume and/or frequency.

In one embodiment the sound is adapted to increase in volume and/or frequency at two or more levels of volume and/or frequency depending on the at least one position.

In one embodiment the sound is adapted to decrease in volume and/or frequency at two or more levels of volume and/or frequency depending on the at least one position.

In one embodiment, the at least one stimulus device comprises two (or at least two) vibrators, one vibrator being on left side of the collar and other vibrator being on right side of the collar, and the at least one stimulus is in a form of a vibration that is able to be sensed by the animal, the vibration being generated by at least one of the two (at least two) vibrators.

In one embodiment, the vibration is variable in strength and/or frequency.

In one embodiment the vibration is adapted to increase in strength and/or frequency at two or more levels of strength and/or frequency depending on the at least one position.

In one embodiment the vibration is adapted to decrease in strength and/or frequency at two or more levels of strength and/or frequency depending on the at least one position.

In one embodiment, the at least one stimulus device comprises two (at least two) electrodes, one electrode being on left side of the collar and other electrode being on right side of the collar, and the at least one stimulus is in a form of an electric shock (electric current) that is able to be sensed by the animal, the electric shock being generated by at least one of the two (at least two) electrodes.

In one embodiment, the electric shock is variable in magnitude.

In one embodiment the electric shock is adapted to increase in magnitude at two or more levels of magnitude depending on the at least one position.

In one embodiment the electric shock is adapted to decrease magnitude at two or more levels of magnitude depending on the at least one position.

In one embodiment, the at least one position is the at least one angular position relative to a datum or relative to at least read angular position or the at least one position value relating to the angular position.

In one embodiment, the at least one position is the at least one angular position relative to a horizontal plane.

In one embodiment, the at least one position is the at least one angular heading of the animal.

In one embodiment, the at least one angular position is the course of the animal.

In one embodiment, the at least one position is at least one location of at least part of the animal.

In one embodiment, the at least one position is at least one location relative to a datum.

According to a third aspect, the invention comprises a system for controlling an animal, the system comprising:
  at least one of the remote processor and a remote server configured to be located at a remote location from the animal; and
  an apparatus as defined in any one of the above statements,
    the at least one of the remote processor and the remote server being operatively connected to a user interface of a user device for allowing a control command relating to at least one stimulus to be applied to the animal to be sent from the at least one of the remote processor and the server to the at least one controller of the apparatus in the form of a control signal,
    the at least one controller of the apparatus being configured to receive the control signal from the at least one of the remote processor and the server and transmit the control signal to the at least one stimulus device, the at least one stimulus device being configured to receive the control signal from the at least one controller and administer at least one form of stimulus to the animal that is able to be sensed by the animal on the basis of the control signal.

According to a fourth aspect, the invention comprises an animal collar capable of being secured around the neck of an animal for allowing a physical response from the animal based on at least one stimulus applied to the animal from at least one of a local or a remote location, the collar comprising:
  at least one stimulus device for applying at least one stimulus to the animal, the at least one stimulus device comprising at least one of:
  at least one speaker configured to be positioned proximal to an ear of the animal to generate an audible sound to the animal when the collar is secured to the animal;
  at least one vibrator configured to cause vibration to be felt by the animal when the collar is secured to the animal; and
  at least one electrode able to contact the neck of the animal when the collar is secured around the neck of the animal to provide an electric shock to the animal;
  the collar further comprising:
  at least one battery to provide electrical power to the at least one stimulus device;
  at least one controller to control the delivery of power to the at least one stimulus device.

In one embodiment, the sound is variable in volume and/or frequency.

In one embodiment the sound is adapted to increase in volume and/or frequency at two or more levels of volume and/or frequency depending on the at least one position.

In one embodiment the sound is adapted to decrease in volume and/or frequency at two or more levels of volume and/or frequency depending on the at least one position.

In one embodiment, the vibration is variable in strength and/or frequency.

In one embodiment the vibration is adapted to increase in strength and/or frequency at two or more levels of strength and/or frequency depending on the at least one position.

In one embodiment the vibration is adapted to decrease in strength and/or frequency at two or more levels of strength and/or frequency depending on the at least one position.

In one embodiment, the electric shock is variable in magnitude.

In one embodiment the electric shock is adapted to increase in magnitude at two or more levels of magnitude depending on the at least one position.

In one embodiment the electric shock is adapted to decrease magnitude at two or more levels of magnitude depending on the at least one position.

In one embodiment, the physical response is a movement of the head of the animal in at least one of a left and right direction.

In one embodiment, the animal collar comprises or is operatively connected to at least one position sensing device, the at least one position sensing device being configured to determine at least one position (e.g. angular position and/or location) of the animal.

In one embodiment, the at least one position is at least one angular position of at least part of the animal.

In one embodiment, the at least one position is at least one angular position relative to a datum or relative to at least read angular position or the at least one position value relating to the angular position.

In one embodiment, the at least one position is at least one angular position relative to a horizontal plane.

In one embodiment, the at least one position is at least one angular heading of the animal.

In one embodiment, the at least one position is at least one angular position and the at least one angular position is the course of the animal.

In one embodiment, the at least one position is at least one location of at least part of the animal.

In one embodiment, the collar comprises an Inertial measurement unit (IMU) to provide information of the condition of the collar to the remote location, the information comprising of at least one of:
  (a) an indication that the movement of the collar is in an up and down direction to indicate that the animal is eating food from a location lower than its normal standing and/or resting condition (e.g. from the ground or feeding trough), and
  (b) an indication that the movement of the collar is in a left and right direction to indicate that the animal is turning its head to either a left or right direction.

In one embodiment, the collar comprises a location sensor to provide location information of the collar to at least one of the local and the remote locations.

In one embodiment, the collar comprises a navigation device to provide location information of the collar to at least one of the local and remote locations.

In one embodiment, the collar comprises a GPS unit to provide location information of the collar to at least one of the local and remote locations.

In one embodiment, the at least one controller is programmable remotely to control the delivery of power to the at least one stimulus device on the basis of the information received from the IMU and/or the GPS unit.

In one embodiment, the at least one controller re-programmable locally when the location of the collar is sensed to be out outside of a boundary or fencing.

In one embodiment, the at least one stimulus device comprises at least two electrodes, at least one of which is to contact the left side of the neck of the animal and at least one of which is to contact the right side of the neck of the animal.

In one embodiment, the at least one stimulus device comprises at least two speakers, at least one of which is to contact the left side of the neck of the animal and at least one of which is to contact the right side of the neck of the animal.

In one embodiment, the at least one stimulus device comprises at least two vibrators, at least one of which is to contact the left side of the neck of the animal and at least one of which is to contact the right side of the neck of the animal.

According to a fifth aspect, the invention comprises a method of controlling an animal, the method comprising:
  detecting, using at least one sensing device, at least one position of at least part of the animal as at least one position value;
  transmitting, using at least one transmitting device, the at least one position value in a form of at least one output signal;
  receiving, using at least one receiving device, the at least one output signal;
  reading, using at least one controller, the at least one position value from the output signal; and
  comparing, using at least one controller, the at least one position value with at least one predetermined value in order to determine if a control action is required, the control action being transmitting a control signal to at least one stimulus device that causes the stimulus device to administer at least one form of stimulus to the animal in order to control the animal.

In one embodiment, from a result of comparison if it is determined that a control action is required, the method further comprises a step of:
  transmitting, using the at least one transmitting device, the control signal to at least one stimulus device thereby causing the at least one stimulus device to administer at least one form of stimulus to the animal to control the animal.

In one embodiment, the step of transmitting the control signal to the at least one stimulus device occurs if the at least one position value either exceeds or substantially exceeds or is below or is substantially below the at least one predetermined value.

In one embodiment, the step of transmitting the control signal to the at least one stimulus device occurs until it is determined that the at least one position value is same or substantially the same as the at least one predetermined value.

In one embodiment, if it is determined that the at least one position value is same or substantially the same as the at least one predetermined value no form of stimulus is administered to the animal.

In one embodiment, if it is determined that the at least one position value is same or substantially the same as the at least one predetermined value, the at least one sensing device continues to detect at least one position of at least part of the animal as at least one position value, the at least one transmitting device continues to transmit the at least one position value in a form of at least one output signal; the at least one receiving device continues to receive the at least one output signal, the at least at least one controller continues to read the at least one position value from the output signal and compare the at least one position value with at least one predetermined value in order to determine if the control action is required.

In one embodiment, the step of determining if the control action is required is performed by the controller.

In one embodiment, the step of determining if the control action is required is performed using at least one of a remote processor and a server that is operatively connected to the controller.

In one embodiment, the step of determining if the control action is required is performed using a user device that is operatively connected to the controller.

In one embodiment, the at least one stimulus is in the form of at least one of a sound, a vibration and an electric shock.

In one embodiment, the at least one of the sound and the vibration is administered by the at least one stimulus device before applying the electric shock.

In one embodiment, the sound is variable in strength and/or frequency.

In one embodiment, the electric shock is variable in magnitude.

In one embodiment the sound is adapted to increase in volume and/or frequency at two or more levels of volume and/or frequency depending on the at least one position.

In one embodiment the sound is adapted to decrease in volume and/or frequency at two or more levels of volume and/or frequency depending on the at least one position.

In one embodiment, the vibration is variable in strength and/or frequency.

In one embodiment, the electric shock is variable in magnitude.

In one embodiment the vibration is adapted to increase in strength and/or frequency at two or more levels of strength and/or frequency depending on the at least one position.

In one embodiment the vibration is adapted to decrease in strength and/or frequency at two or more levels of strength and/or frequency depending on the at least one position.

In one embodiment, the electric shock is variable in magnitude.

In one embodiment, the electric shock is variable in magnitude.

In one embodiment the electric shock is adapted to increase in magnitude at two or more levels of magnitude depending on the at least one position.

In one embodiment the electric shock is adapted to decrease magnitude at two or more levels of magnitude depending on the at least one position.

In one embodiment, the method includes controlling the position of an animal.

In on embodiment, the method includes controlling the position of an animal to guide the animal towards a particular position or path.

In one embodiment, the method includes controlling the position of an animal to guide the animal at a particular position or path.

Other aspects of the invention may become apparent from the following description which is given by way of example only and with reference to the accompanying drawings.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

BRIEF DESCRIPTION OF THE DRAWINGS

The invention will now be described by way of example only and with reference to the drawings in which.

DETAILED DESCRIPTION OF PREFERRED EMBODIMENT(S)

The following description will describe the invention in relation to examples and/or drawings. The invention is in no way limited to the example(s) and/or drawing(s) as they are purely to exemplify the invention only and that possible variations and modifications would be readily apparent without departing from the scope of the invention described in this specification and/or defined in the claims.

Figure 1:
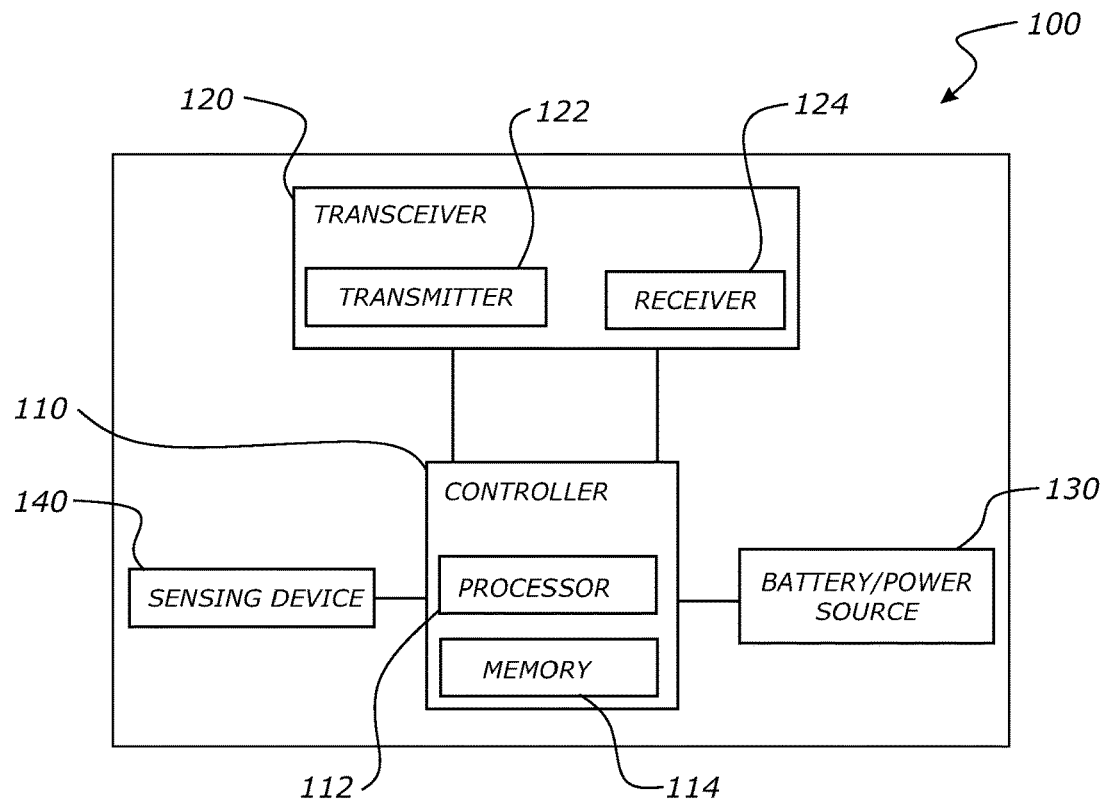
FIG. 1 shows a schematic block diagram of an apparatus for controlling, recording and/or monitoring positions of an animal according to one embodiment of the present invention.

FIG. 1 shows a general schematic block diagram of an apparatus 100 for controlling an animal, particularly for controlling the positions of an animal according to one embodiment of the present invention. As it would be apparent to a skilled person, the apparatus 100 may instead or additionally be used for recording and/or monitoring the animal positions.

Figure 7:
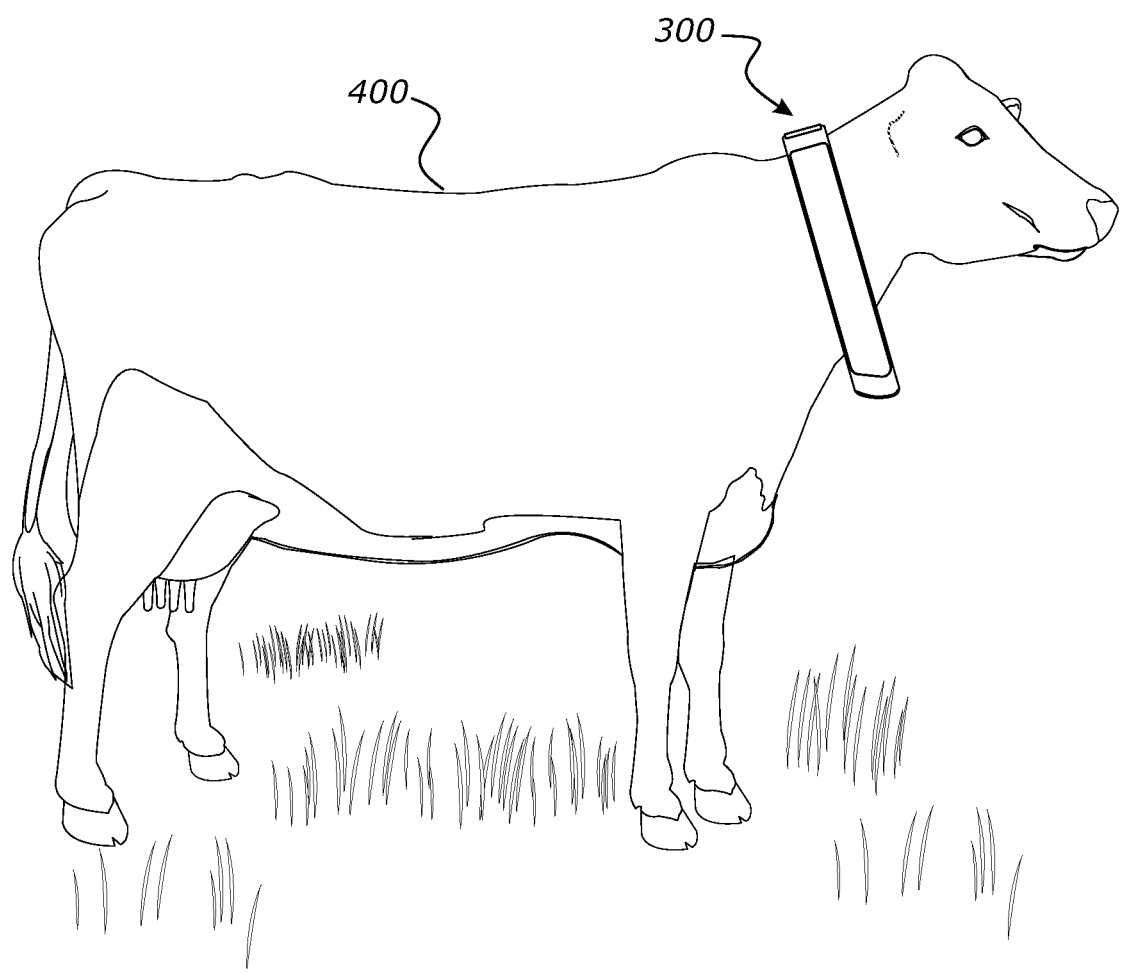
FIG. 7 shows animal collar secured around the neck of a cow and for stimulating a physical response to the cow.

In this example, at least one stimulus device (not shown in FIG. 1) is configured to be carried or worn by an animal and is configured to be activated and administer one or more form of stimulus (such as electric shock, sound or vibration) to the animal when the stimulus device receives a control signal. For example, the stimulus device may be in a form of an animal collar 300 configured to be worn by an animal such as cow around its neck, similar to the manner as shown in FIG. 7.

The apparatus 100 comprises at least one sensing device 140 (which is a position sensing device) which may be an angular position sensing device that is configured to detect at least an angular position of at least the part of the animal. The position sensing device 140 could or could also be a location sensing device. The location sensing device is configured to detect the longitude, latitude and/or horizontal position of the animal. Alternatively, the sensing device 140 may comprise or be communicated to both the angular position sensing device as well as the location sensing device.

The variation where the sensing device 140 comprises or communicates with angular position sensing device will now be described. The variation where the at least one sensing device 140 comprises or communicates with a location sensing device will be described later in more detail.

The angular position may be the angular position relative to a datum (e.g. horizontal plane or ground). It may be angular position relative to a previously measured angular position.

The angular position of at least part of the sensing device 140 may be measured in three orthogonal directions, the three orthogonal directions being roll, pitch and yaw. In one embodiment, the angular position of at least one of the head and the neck of the animal is measured in three orthogonal directions, the three orthogonal directions being roll, pitch and yaw. Preferably, the sensing device 140 comprises or is an inertial measurement unit (IMU) or a gyroscope. Detection of such angular position can provide an indication of movement in an up and down direction as well as in a left or right direction. If the sensing device 140 is operatively connected to sense the head movement of an animal such as a cow in a field, then movement in up and down direction can indicate that the animal is eating food such as from a location lower than its normal standing and resting condition. The head and neck of the animal will be moving up and down relatively more frequently than if the animal was merely loafing. Similarly, movement in a left and right direction may indicate that the animal is heading/turning to either a left or a right direction. The angular position may hence provide an indication of the animals heading and/or course and rate of change of course. The angular position may be of part of the animal and/or may indicate the entire animal's heading and/or course.

Reverting back to FIG. 1, the apparatus comprises at least one controller 110. The controller 110 is operatively connected to the sensing device 140, which in this case may be programmed to read the angular position value detected by the sensing device 140 as a position value(s) and compare such angular position value(s) (position value(s)) with a predetermined value(s) relating to position in order to determine if one or more control action is required.

If the controller 110 determines that a control action is required, then the controller 110 is configured to transmit of at least one control signal to one or more stimulus device that is able to be sensed by the animal. The stimulus device may be in a form of an apparatus that is separate but is operatively connected to at least one controller 110 of the apparatus 100 and may be adapted to be carried (worn) by the animal and when the control signal is received, the stimulus device is configured to be activated in order to administer one or more form of stimulus to the animal. The stimulus may be of any form that could be sensed by an animal such as but not limited to electric current such as electric shock (preferably of variable magnitude), sound (preferably of variable volume and/or frequency), vibration (preferably of variable strength or intensity and/or frequency) or a combination thereof.

Instead of the controller 110 determining if a control action is required, the controller may optionally be connected to a remote processor (see processor of PC 890 in FIG. 8) or a remote server (see cloud server 880 in FIG. 8) or a user device (see mobile device 830 in FIG. 8) comprising a user interface and is configured to perform the control action on the basis of a control command received from the remote processor. Preferably, the remote processor is operatively connected to or is part of the user device such as a smartphone, PDA, PC, laptop or many other suitable user device. Similarly, the remote server may be operatively connected to the user device (such as PC 890 of FIG. 8 or processor of PC 890 of FIG. 8). More preferably, the control command is sent by the user from the user interface of the user device.

For example, the user (see user 820 in FIG. 8 as an example) may be monitoring the result of comparison performed by the controller on a screen of a PC (see PC 890 in FIG. 8 as an example) or smartphone (see mobile device 830 in FIG. 8 as an example) having appropriate software or mobile app installed, and depending upon the result of the comparison, the user may send an appropriate control command to the controller 110 via a remote processor, remote server and/or the user device having a user interface. The control command may then be received by the controller 110 in the form of a signal (control signal) which may then determine, on the basis of the control command (control signal) received, as to whether a control action is required. If the controller 110 determines from a control command that no stimulus is to be applied to the animal, then no control signal will be transmitted or sent to the stimulus device. However, if the controller 110 determines from a control command that a stimulus (such as a sound and/or vibration and/or an electric shock) is to be applied to the animal, then a control signal will be send to the stimulus device to administer appropriate form of stimulus to the animal.

Figure 2:
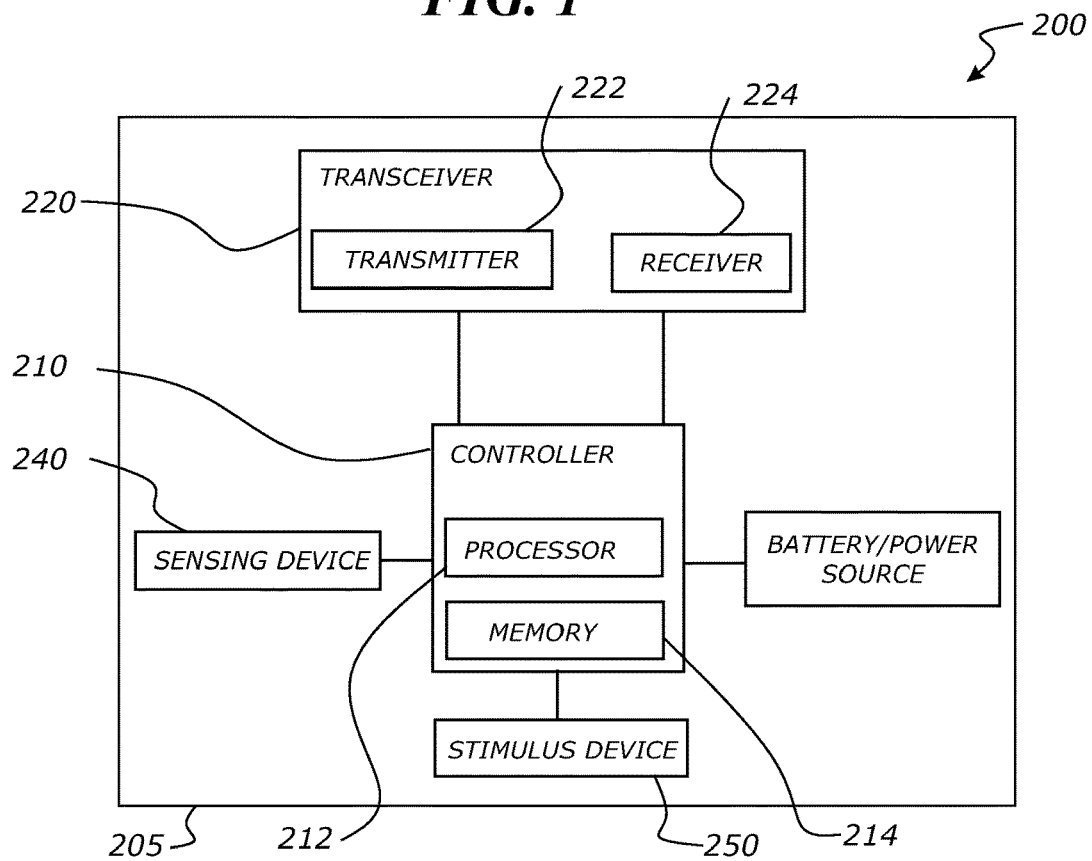
FIG. 2 shows a schematic block diagram of an apparatus for controlling, recording and/or monitoring positions of an animal according to a second embodiment of the present invention.

FIG. 2 shows a general schematic of a perspective view of an apparatus 200 for controlling, recording and/or monitoring an animal, particularly for controlling the positions of an animal according to another embodiment of the present invention.

The apparatus 200 is substantially similar to the apparatus 100 described above with reference to FIG. 1 so most of the description above with for apparatus 100 and components of the apparatus 100 above applies equally to apparatus 200.

The differences are that, unlike, the apparatus 100 of FIG. 1 which is configured to be located remotely from the animal and configured to communicate with a stimulus device in contact with the animal, the apparatus 200 of FIG. 2 is configured to be carried or worn by the animal and comprises at least one stimulus device 250 as part of the apparatus 250. Preferably, the apparatus 200 comprises a housing 205 that comprises, houses, carries or attaches at least the sensing device 240, controller 210 and stimulus device 250. The apparatus 200 may be in a form of an animal collar 300 configured to be worn by an animal around its neck in a manner similar to the one as shown in FIG. 7. Battery or suitable form of power source 230 may be provided to provide power to the controller 210, sensing device 240, transceiver 220 and the stimulus device 250. More preferably, the housing 205 comprises, carries or attaches, the battery 230 and transceiver 220 as well.

The sensing device 140, 240 could be a location sensing device carried by an animal or be in electronic communication with a location sensing device that may be carried by an animal. The location may be location relative to datum. The location may be location relative to global position. The location sensing device may be configured to detect the longitude, latitude and/or horizontal position of at least part of the animal.

Reverting back to FIGS. 1 and 2, the controller 110, 210 may be operatively connected to the sensing device 140, 240, and may be programmed to read at least one location value detected by the sensing device 140, 240 as at least one position value and compare the location value(s), i.e the position value(s) with a predetermined value(s) relating to position in order to determine if one or more control action is required.

The sensing device 140, 240 comprises or may be in electronic communication with a location sensing device which may be a location/navigation sensor that is part of the sensing device 140, 240 or is in electronic communication with the sensing device 140,240. At least the location/navigation sensor may be configured to be carried by the animal. Preferably, the location/navigation sensor is a global position system (GPS) position sensor or a GPS receiver.

The GPS position sensor/receiver may determine the longitude, latitude, altitude, and/or horizon position of animal of the animal. Locating position information of an object with GPS position sensor is previously known in the art and need not be described in much detail. Basically, a GPS sensor/receiver may calculate its position by precisely timing the signals sent by GPS satellites high above the Earth. Each satellite may continually transmit messages that may include the time the message was transmitted, precise orbital information (the ephemeris), the general system health, and rough orbits of all GPS satellites (the almanac). The GPS sensor/receiver may the use the messages it receives to determine the transit time of each message and compute the distance to each satellite. These distances along with the satellites' locations may be used with the possible aid of trilateration, depending on which algorithm is used, to compute the position of the receiver/sensor, and therefore the animal attached to the receiver/sensor. Where the GPS sensor/receiver is located remotely from the sensing device 140,240 but is in electronic communication with the sensing device 140, 240, the position of the animal will be transmitted to the sensing device 140, 240.

Rather that the location/navigation sensor being a global position system (GPS) position sensor or a GPS receiver, the location/navigation sensor may optionally be a local positioning system (LPS) position sensor or LPS receiver. LPS receiver may use beacon(s) such as cellular base stations, Wi-Fi access points, and radio broadcast towers to compute the position of the receiver/sensor, and therefore the animal attached to the LPS receiver/LPS position sensor.

The controller 110, 210 may be operatively connected to the sensing device (140, 240), and may be programmed to read the location value(s) detected by the sensing device 140 as the position value and compare the location (position) value(s) with predetermined value(s) relating to position in order to determine if one or more control action is required. Preferably, the location (position) value(s) is made up of at least two GPS or LPS co-ordinates.

If the controller 110, 210 determines that a control action is required, then the controller may be configured to transmit at least one control signal to one or more stimulus devices such as stimulus device 250 adapted to administer one or more form of stimulus to the animal that is/are capable of being sensed by the animal. As mentioned above, the stimulus device may be adapted to be carried (worn) by the animal and when the control signal is received, the stimulus device may be configured to be activated in order to administer one or more form of stimulus to the animal. The stimulus may be of any form that could be sensed by an animal such as but not limited to electric shock, sound, vibration or a combination thereof.

If the sensing device 140, 240 comprises or is in electronic communication with both the angular position sensing device as well as the location sensing device, then the controller 110, 210 which may be operatively connected to the sensing device 140, 240 may be programmed to read the angular position value and/or the location value from the sensing device 140 as position value(s) and compare the angular position value and/or location value (position value(s)) with a predetermined value or values in order to determine if one or more control action is required.

As described above, instead of the controller 110, 210 determining if a control action is required, the controller may optionally be connected to a remote processor, remote server and/or a user device comprising a user interface and that may be configured to perform the control action on the basis of a control command received from the remote processor, remote server and/or user device.

Preferably, the apparatus 100, 200 in each embodiment as shown in FIGS. 1 and 2, comprises or may be operatively connected to at least one transmitting device such as a transceiver 120, 220 comprising a transmitter 122, 222 and a receiver 124, 224. Many other suitable forms of transmitting device adapted to transmit or send the signal(s) representing angular position value and/or location value from the sensing device 140, 240 to the controller 110, 210 may be used. If the controller determines or receives a control command that the control action is required, then the controller (110) transmits the control signal to the stimulus device which causes the stimulus device to administer one or more form of stimulus to the animal.

The controller 110, 210 in FIGS. 1 and 2 is preferably a programmable controller that comprises or is operatively connected to a processor 112, 212 and a memory 114, 214. The memory 114, 214 may be a Random Access Memory (RAM) or an Electrically Erasable programmable read-only memory (EEPROM) or any other memory suitable for storing at least the predetermined value relating to the angular position and/or location of the animal.

FIGS. 3 to 6 shows an animal collar 300 capable of or configured to be being secured around the neck of an animal 400 in order to control position of the animal 400. The animal collar 300 may be suitable for allowing a physical response from an animal 400 from at least one of a remote and a local location. The collar 300 may also be suitable for reporting movement of the collar 300 to a remote location.

The collar 300 of this example of a preferred embodiment carries at least one stimulus device or control device in a form of at least one of: speakers 350a, 350a', vibrators 350b, 350b', and electrodes 350c, 350c'. The housing of the collar 300 is referred by reference numeral 305.

In this example of a preferred embodiment, there may be two speakers 350a, 350a', the first speaker 350a may be on the left-hand side and is adapted to be to be positioned more proximal the left ear of the animal 400 and a second speaker 350a' may be on the right-hand side and is adapted to be positioned more proximal the right ear of the animal 400. Both the speakers 350a, 350a' may be capable of transmitting sound independently and in concert with the other. Instead of having speakers 350a, 350a' on two sides, it may be possible that the collar 300 only comprises one speaker(s) on one side, or in the centre position of the collar (300).

Figure 4:
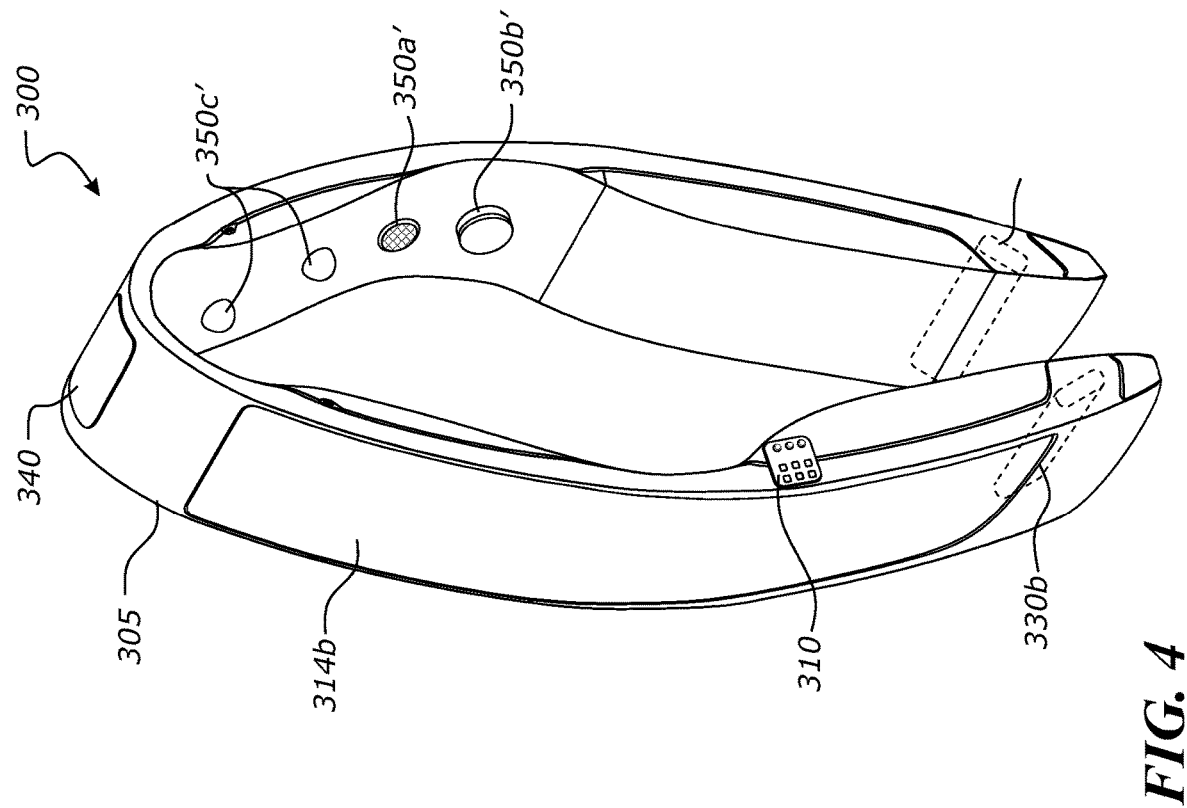
FIG. 4 shows another side perspective view of the animal collar of FIG. 3.
Figure 3:
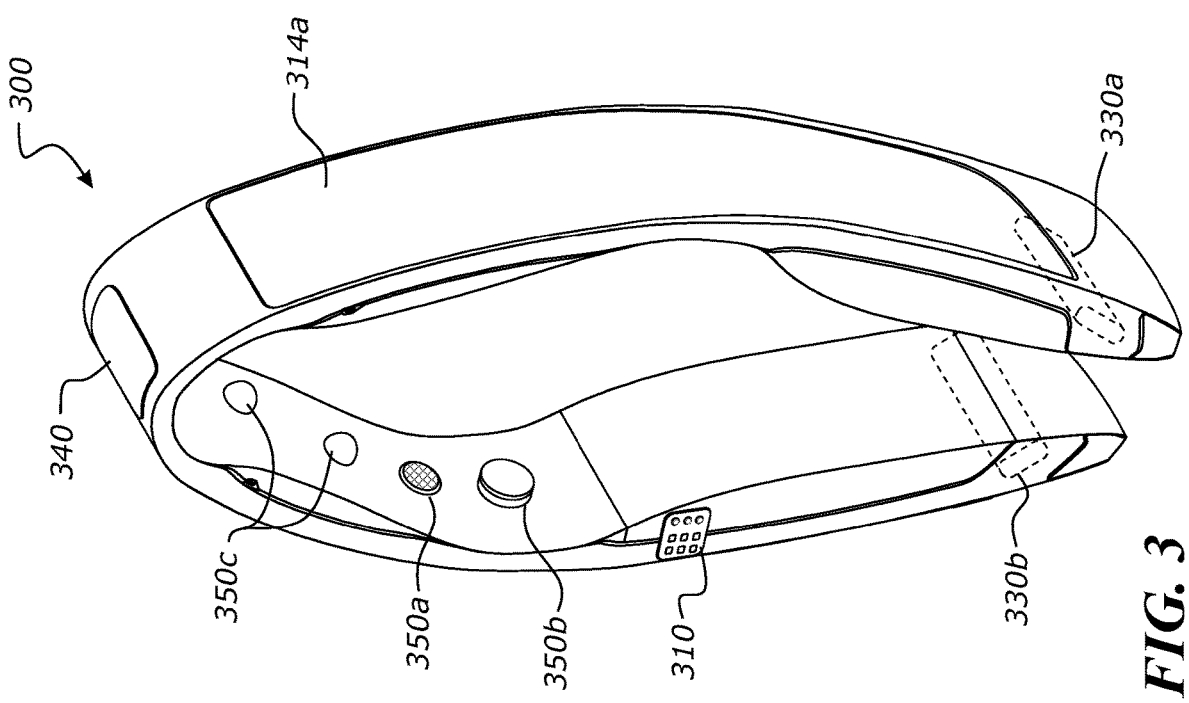
FIG. 3 shows a one side perspective view of an animal collar for controlling, recording and/or monitoring positions of an animal according one embodiment of the present invention.

In this example of a preferred embodiment, it is shown that there are two vibrators 350b, 350b', the first vibrator 350b is on the left hand side (see FIG. 3) a second vibrator 350 b' is on the right hand side (see FIG. 4). Both the vibrators 350b 350b' are capable of vibrating independently and in concert with the other. Instead of having vibrators 350*b*, 350*b'* on two sides, it may be possible that the collar 300 only comprises vibrator(s) on one side, or in the centre position of the collar 300.

There may be electrode(s) 350*c*, 350*b'* for contacting the neck of the animal 400 when the collar 300 is secured around the neck of the animal to provide an electrical current or shock to the animal. The first electrode 350*c* may be on the left hand side (see FIG. 3) and the second electrode 350*c'* may be on the right hand side (see FIG. 4). Both the electrodes 350*c*, 350*c'* are capable of providing an electrical current or shock to the animal independently and in concert with the other. Instead of having electrodes 350*c*, 350*c'* on two sides, it may be possible that the collar 300 only comprises electrode(s) on one side, or in the centre position of the collar 300. In one embodiment, the collar 300 may comprise just vibrator, speaker and/or electrode. In another embodiment, the collar 300 may comprise more than two vibrators, speakers and/or electrodes.

It may be possible, that the collar 300 comprises either speaker(s) 350*a*, 350*a'*, vibrator(s) 350*b*, 350*b'* or electrode(s) 350*c*, 350*c'*. It may also be possible that, the collar comprises either speaker(s) 350*a*, 350*a'* and vibrator(s) 350*b*, 350*b'*, or speaker(s) 350*a*, 350*a'* and electrode(s) 350*c*, 350*c'*, or vibrator(s), 350*b*, 350*b'* and electrode(s) 350*c*, 350*c'*.

The collar 300 comprises at least one sensing device 340 which is a position sensing device. The sensing device 340 comprises or is in electronic communication with an angular position sensing device and/or location sensing device similar to the one as described above with reference to FIGS. 1 and 2 and the angular position sensing device and/or location sensing device may work in the same or similar way as described above with reference to FIGS. 1 and 2.

The collar comprises a controller 310 adapted to control the delivery of power to the stimulus device(s) 350*a*, 350*a'*, 350*b*, 350*b'*, 350*c*, 350*c'*. The controller 310 may be operatively connected to the sensing device 340 and to read the position value(s) (e.g. angular position value and/or location value) from the sensing device (340) and compare the position value(s) with predetermined value(s) in order to determine if one or more control action is required. This may be done in the same manner as described above with reference to FIGS. 1 and 2 and therefore need not be described again. Similarly, instead of the controller 310 determining if a control action is required, the controller (310) may optionally be connected to a remote processor (e.g. processor of PC 890 of FIG. 8), a remote server (e.g. processor of PC 890 of FIG. 8) and/or a user device (e.g. mobile device 830 of FIG. 8) comprising a user interface and is configured to perform the control action on the basis of a control command received from the remote processor, remote server and/or the user device. Such functionality has already been described above with reference to FIGS. 1 and 2 and therefore need not be described again.

The collar 300 may comprise at least one power source such as a battery to provide electrical power to controller and the stimulus device(s) 350*a*, 350*a'*, 350*b*, 350 *b'*, 350*c*, 350*c'*. In this example, it is shown that the power source is in a form of two batteries 330*a*, 330*b* that may be chargeable via solar panels 314*a*, 314*b* on two sides. It may be possible that there is only one battery or more than two batteries and if the battery or batteries are chargeable via solar panel(s), then the solar panel(s) may be located on only one side of the collar 300.

Preferably, the collar 300, comprises or is operatively connected to at least one transceiver comprising a transmitter and a receiver. The transceiver or many other suitable forms of transmitting device are preferably adapted to transmits or send the angular position value and/or location value from the sensing device to the controller 310. If the controller 310 determines or receives a control command that the control action is required, then the controller 310 transmits the control signal to the stimulus device(s) 350*a*, 350*a'*, 350*b*, 350 *b'*, 350*c*, 350*c'* which causes the stimulus device(s) 350*a*, 350*a'*, 350*b*, 350 *b'*, 350*c*, 350*c'* to administer at least one form of stimulus to the animal 400. The angular position value and/or location value over time, may also be stored at the collar and retrieved from time to time, e.g. when an animal moves into a milking shed and via Bluetooth or like protocol the data is downloaded from the collar 300.

Figure 6:
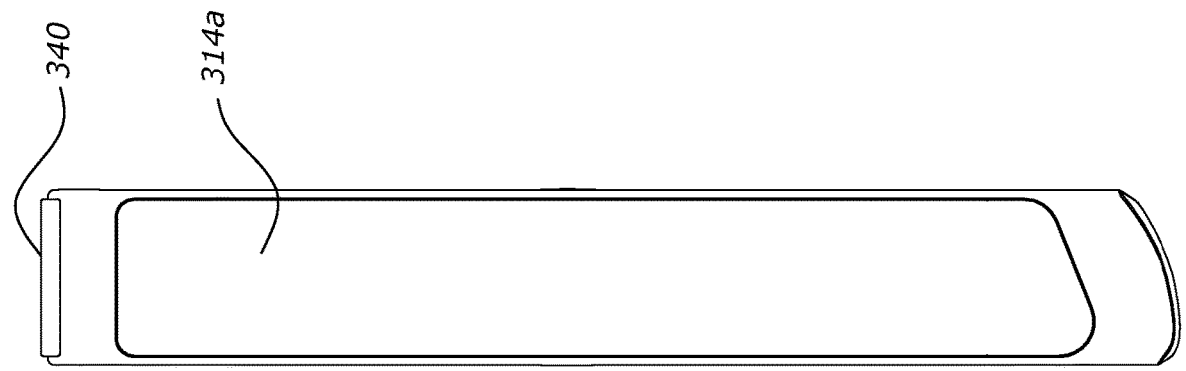
FIG. 6 shows aside elevation view of the animal collar of FIG. 3.
Figure 5:
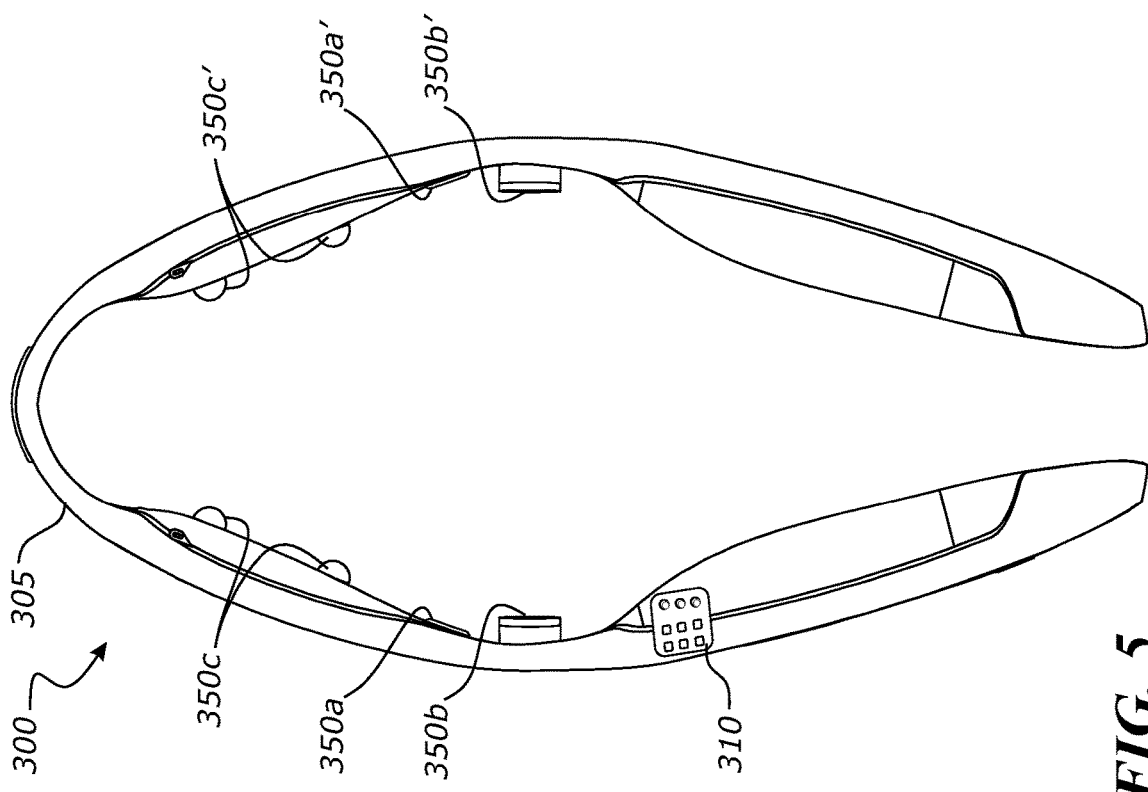
FIG. 5 shows a front view of the animal collar of FIG. 3.

The controller 310 in FIGS. 4 to 6 may preferably be a programmable controller that comprises or is operatively connected to a processor and a memory. The memory may be a Random Access Memory (RAM) or an Electrically Erasable programmable read-only memory (EEPROM) or any other memory suitable for storing at least the predetermined value(s) relating to the angular position and/or location of the animal. The controller 310 may be programmable remotely to control the delivery of power to the at least one stimulus device such as at least one speaker 350*a*, 350*a'*, the at least one vibrator 350*b*, 350*b'* and the at least one electrode 350*c*, 350*c'* on the basis of the information received from the IMU and/or the GPS unit. In one embodiment, the at least one controller is re-programmable locally when the location of the collar 300 is sensed to be out outside of a boundary or fencing.

FIG. 7 shows an example where a collar 300 is secured around the neck of an animal 400 (a cow) in order to help control the position of the animal 400 in a field. The apparatus 200 as described with reference to FIG. 2 may also be in a form of a collar similar to collar 300 that is secured around the neck of a cow in a similar way as shown in FIG. 7. In the same way, at least one stimulus device that is operatively connected to the apparatus 100 as described in FIG. 1 may be connected or housed inside a collar that is secured around the neck of a cow in a similar way as shown in FIG. 7.

Figure 8:
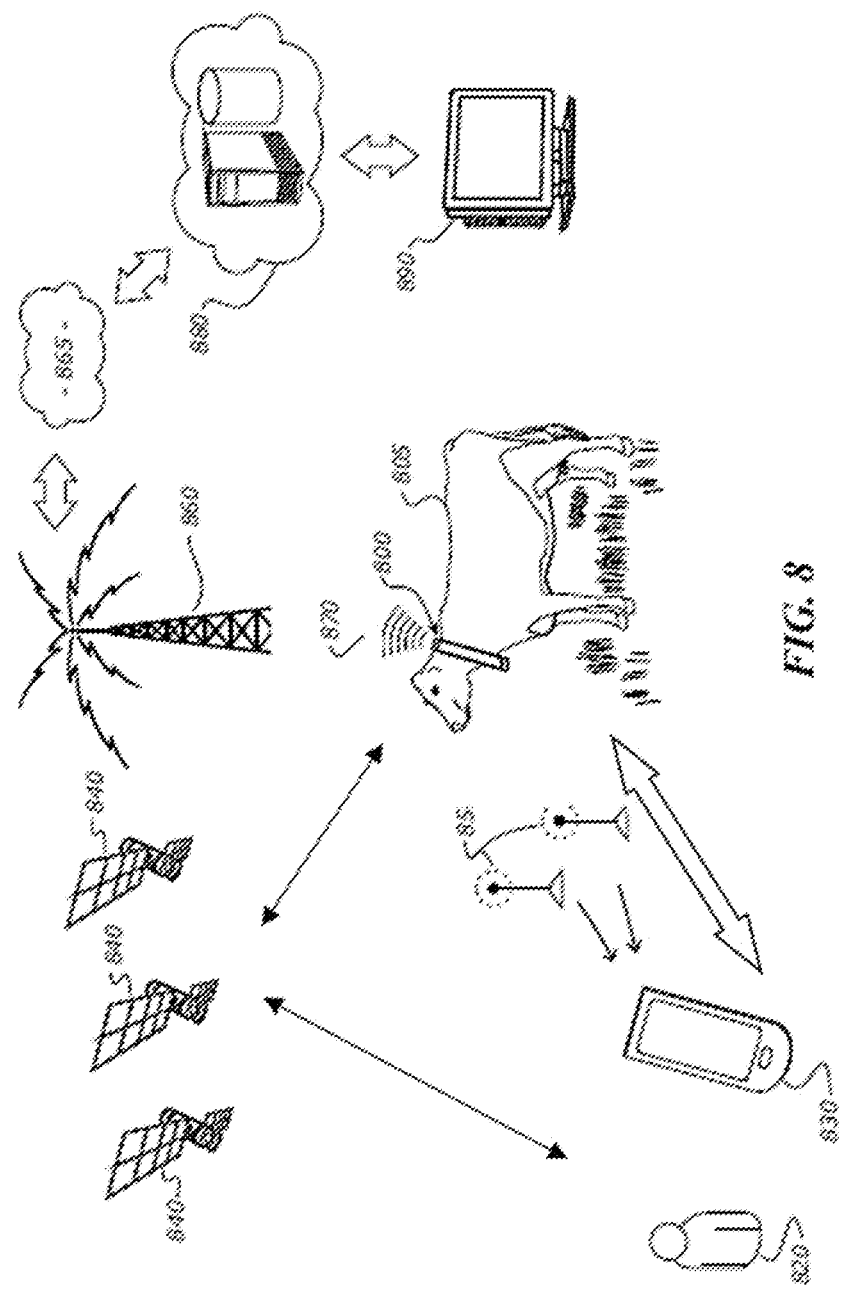
FIG. 8 shows one example of a general communication system infrastructure diagram incorporating the features of the invention in an example where a position of a cow in a field is being controlled, recorded and/or monitored using the present invention.

FIG. 8 shows one example of a communication system infrastructure diagram incorporating the features of the invention in an example where a position of a cow 805 in the field is being monitored and controlled (e.g. remotely).

In this example, the user 820 tracks the position of a cow 805 within a particular portion of the field and if deemed necessary or desirable, apply a desired form of stimulus to the cow 805. The user 820 may use a software application (such as mobile app) on a user device such as a mobile device 830, which includes, or can receive information from receivers capable of detecting signals originating from GPS satellites 840, WiFi repeater/booster stations 850, and one or more cell towers 860, as well as signal 870 originating from a collar 800 carried by the cow 810. The collar 800 may be in a form of an apparatus comprising a housing that attaches or partially houses at least one stimulus device that is operatively connected (i.e. in electronic communication) with at least at least one controller such as controller 110 of the apparatus 100 of FIG. 1. In on embodiment, the collar 800 may comprises the apparatus 200 as described above with reference to FIG. 2 or the collar 800 may be same as the collar 300 as described above with reference to FIGS. 3 to 6.

By connecting with the Internet 865 via WiFi, Bluetooth, or cell transmissions such as 3G, 4G, LTE etc., the software application may access the positional data (angular and/or locational positional data) stored on a remote server, such as cloud server 880. The data contained in the cloud server 880 can also be access by remote processor of a computing device, such as a PC 890, via a connection through the Internet 865.

The user 820 may monitor the result of the comparison performed by the controller that is either part of or is operatively connected to the collar 800 on a screen of the mobile device 830, and depending upon the result of the comparison, the user 820 may send an appropriate control command to the controller. The control command may also be sent directly from the cloud server 880 or from the cloud server 880 through a user device (e.g. PC 890) or the processor of the user device (e.g. processor of PC 890) that is operatively connected to the cloud server 880. The control command may then be received by the controller which will then determine on the basis of the control command received as to whether a control action is required. If the controller determines from a control command that no stimulus is to be applied to the cow 805, then no control signal will be transmitted or sent to the stimulus device of the apparatus 800. However, if the controller determines such as from a control command that a stimulus (such as a sound and/or vibration and/or an electric shock) is to be applied to the cow 805, then a control signal may be send to the stimulus device of the apparatus 800 to administer the appropriate form(s) and/or intensity of stimulus to the cow 805.

A skilled person may appreciate that the above description with reference to FIG. 8, may apply for controlling position of a cow using the apparatus 100, 200 as described with reference to FIG. 1 or 2 or to the collar 300 as described above with reference to FIGS. 3 to 6.

Figure 9:
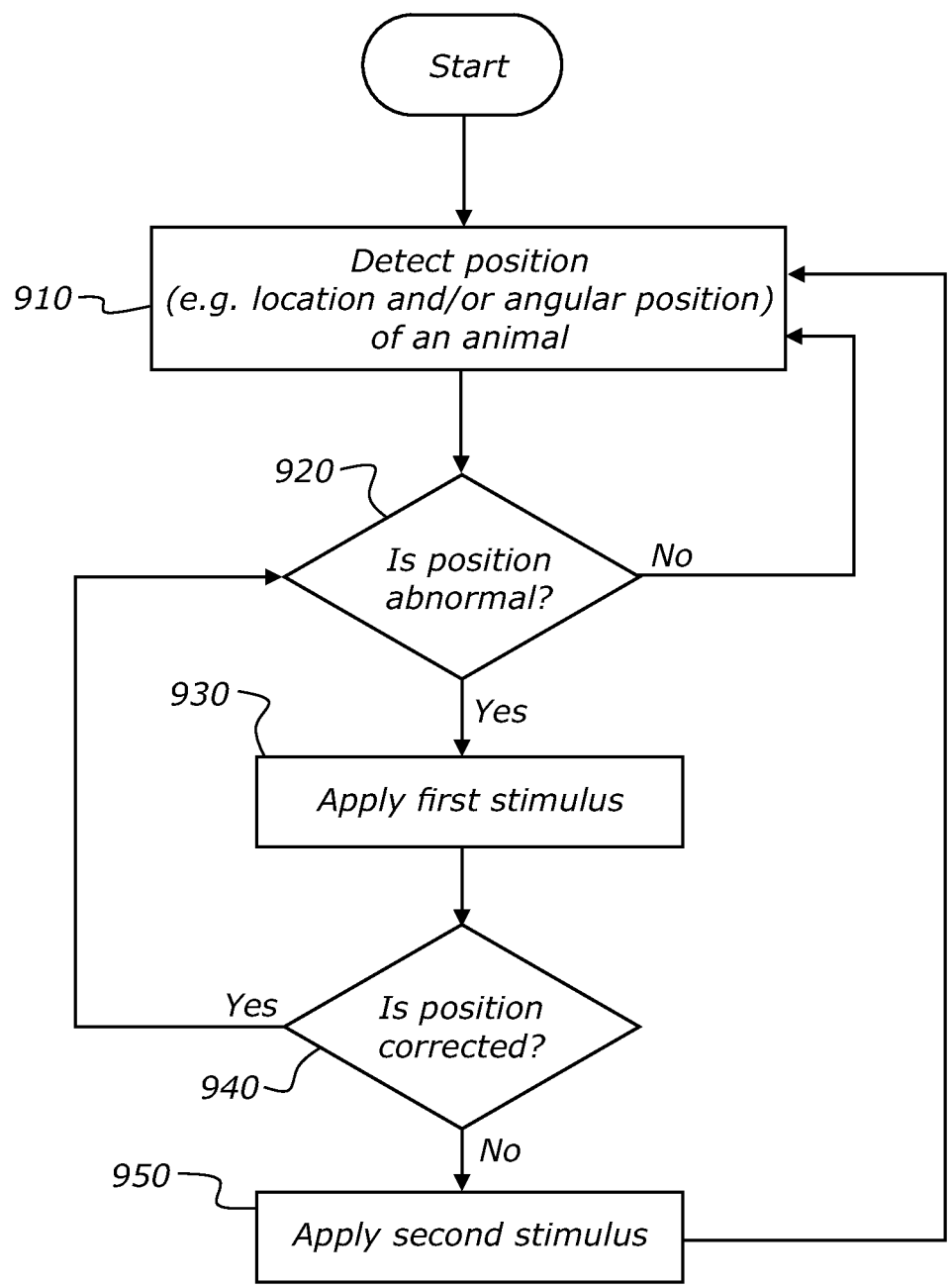
FIG. 9 is a flowchart showing one example of controlling, recording and/or monitoring the positions (angular position and/or location) of an animal.

FIG. 9 is a flowchart showing one example of controlling, the position(s) (angular position and/or location) of an animal. In this example, the animal that is being controlled is a cow using the apparatus 100, 200 or the collar 300, 805 in order to encourage the pasture grown in a confinement zone to be uniformly consumed and also in order to help ensure that no particular area of the field or paddock is overgrazed or under grazed. This may also ensure that the cow does not cross the pre-determined (virtual) boundary of the paddock or field.

The first step 910 involves detection of position such as angular position and/or location of the cow. This is done using the sensing device comprising or is operatively connected to the angular position sensor such as IMU or gyroscope or location sensing device such as navigation sensors GPS or LPS as previously described in this specification.

Detection of angular position can provide an indication of movement in an up and down direction as well as in a left or right direction. If the sensing device senses the head movement of an animal such as a cow in a field, then movement in up and down direction can indicate that the cow is eating food from a location lower than its normal standing and resting condition. The head and neck of the cow will be moving up and down relatively more frequently than if the cow was merely loafing. Similarly, then movement in a left and right which indicate that the animal is turning/heading to either a left or a right direction.

Similarly, detection of location can provide an indication where the cow is located in a particular area of the field/paddock and how close the cow is from the boundary/fence.

The second or subsequent step 920 involves determining if the position(s) (angular position and/or location) of the cow is normal or abnormal. This may be determined by the controller 110, 210, and 310 on the basis of measured/sensed position value(s) (angular position and/or location value) and comparing such measured/sensed position value(s) with a predetermined value(s) relating to the position(s). If the measured position value is within or same or is substantially same as the pre-determined value(s), the controller 110, 210, 310 may determine that the position value(s) of the cow is normal and the cow is grazing in the field in proper and desired manner. However, if the measured/sensed position value(s) fall below or substantially below or exceeds or substantially exceeds the threshold pre-determined value(s), the controller 110, 210, 310 may determine that the angular position and/or location of the cow is abnormal, and the cow is either under grazing or is overgrazing in a particular area of the field. Or is perhaps injured or sick.

In this second step 920, if it is determined that the position value (angular position and/or location value) of the cow is normal, then the sensing device continues to detect the position, as described above in the first step 910 without administering any form of stimulus to the cow.

However, if it is determined that the position of the cow is abnormal, then third step 930 occurs. In this preferred example, in the third step 930 the controller sends a control signal to the stimulus device to apply a first form of stimulus to the cow.

The first stimulus may possibly in a form of sound and/or vibration on the left side, right side and/or both the side of the cow. For example, if it is indicated that the cow is turning too much left, then the first form of stimulus may be applied to the cow on the left hand side thereby attempting to persuade the animal to turn right. Similarly, if it is indicated that the cow is turning too much right, then the first form of stimulus may be applied to the cow on the right hand side thereby so that the cow turns or learns to turn right. Similarly, if it is indicated that the cow is not eating, overeating remains stationary in a particular location for an unreasonably longer period of time, then the first form of stimulus may be applied to the cow from both the sides thereby trying to persuade the cow corrects its location and/or angular position, or learns to correct its location and/or angular position.

The first stimulus may be in the form of a sound that is varied in volume and/or frequency, and/or the vibration that is varied in form of strength and/or frequency. For example, the volume and/or frequency of the sound and/or strength and/or frequency of the vibration may be lower initially and gradually begin to increase. The increase in intensity may be based on the urgency in which a response from the cow is desired. If the cow is getting very close to the virtual boundary, the level of intensity of the sound (i.e. level of volume and/or frequency) and/or vibration (level of volume and/or frequency) may be higher than if the cow was further away or was moving away from the virtual boundary. Applying/administering at least one stimulus that is of variable intensity level is preferable over applying/administering at least one stimulus that is of constant intensity because applying/administrating at least one stimulus with a variable level of intensity can cause the animal to realise and/or learn if they are heading towards the desired position (or away from the undesired position) or towards the undesired position (or away from the desired position). For example, if the level of intensity of the stimulus increases gradually such gradual increase in the level of intensity can provide indication to the animal that it is heading towards the undesired position (e.g. towards the virtual fence). Similarly, if the level of intensity of the stimulus decreases gradually such gradual decrease in the intensity level can provide indication to the animal that it is heading towards the desired position (e.g. away from the virtual fence). Even though, at least one stimulus of constant level of intensity may be used for controlling the animal position, such stimulus of constant level of intensity may not be as efficient as the stimulus of variable intensity level especially in helping the animal to realise and/or learn if they are heading towards/away from the desired or undesired position while the animal is walking. This is because even though suddenly applying a stimulus of a non-variable level may make the animal realise that their position is incorrect it may not necessarily teach them in a systematic manner if the new position that they are now heading towards is the correct or incorrect position. In some cases, suddenly applying a stimulus of a non-variable level may even confuse the animal. Furthermore, in some cases, if the same level of intensity is provided to an animal frequently that animal can be immune to that particular level of intensity after some period and therefore may become non-responsive to the stimulus of that particular level and hence, stimulus of variable level of intensity may be more desirable even for such reason. Furthermore, it can be appreciated that having at least one stimulus that is variable in the level of intensity could also result in reduction in power consumption by the stimulus device(s) since applying at least one stimulus at low level of intensity may consume less power than applying the same stimulus at a higher level or constantly at a higher level.

The fourth step 940 involves determining if the position (location and/or angular position) has been corrected. In this fourth step 920, if it is determined that the position of the cow is now normal, then the sensing device continues to detect the position, as described above in the first step 910 without administering any form of further stimulus to the animal. However, if it is determined that the position of the cow is still abnormal, then fifth step 950 may occur. In this preferred example, in the fifth step 950, the controller sends a control signal to the stimulus device to apply a second form of stimulus to the cow.

The second form stimulus may possibly be an electric current or shock on the left side, right side and/or both the side of the cow. For example, if it is indicated that the cow is turning too much left, then the electric shock may be applied to the cow on the left hand side so that the cow turns or learns to turn right. Similarly, if it is indicated that the cow is turning too much right, then the electric shock may be applied to the cow on the right hand side thereby so that the cow turns or learns to turn left. Similarly, if it is indicated that the cow is not eating, overeating remains stationary in a particular location for an unreasonably longer period of time, then the electric shock may be applied to the cow from both the sides thereby trying to persuade the cow corrects its location and/or angular, or learns to correct its location and/or angular position. The electric shock may be of varied magnitude, i.e., the magnitude may be lower initially and gradually start to increase unless the orientation and/or position of the cow is tending towards a more desired position The fifth step 950 may be optional. In such case, if it is determined in the fourth step 940 that the position of the cow is still abnormal, then the third step 930 occurs again where the controller keeps sends a control signal to the stimulus device to continue applying a first form of stimulus to the cow unless and until the cow corrects its position. The first form of stimulus can alternately be in a form of an electric shock rather than sound and/or vibrations. The electric shock may be also be of varied intensity (i.e. magnitude), i.e., the magnitude of the electric shock may be lower initially and gradually start to increase unless the position is corrected.

Instead of the controller 110, 210, 310 determining if a control action is required, the controller may optionally (and/or additionally) be connected to or connectable to a remote processor (such as processor of PC 890 of FIG. 8) or a user device (such as mobile device 830 of FIG. 8) comprising a user interface and/or server 880 and is configured to perform the control action on the basis of a control command received from the remote processor, user device and/or remote server. Preferably, the remote processor or remote server is operatively connected to or is part of a user device such as a smartphone, PDA, PC, laptop or any other suitable user device. More preferably, the control command is send by the user from the user interface of the user device.

Although, the above description describes a method of controlling the position(s) of a cow using the apparatus of the present invention, many other domesticated, farmed or even wild animals may be controlled using such method.

Therefore, from the above description with reference to FIG. 9 it can be appreciated one aspect of the invention may reside in a method of controlling an animal, the method comprising:

detecting, using at least one sensing device (such as sensing device 110, 210) at least one position of at least part of the animal as at least one position value;

transmitting, using at least one transmitting device (which can be a transmitter or a transceiver 140, 240), the at least one position value in a form of at least one output signal;

receiving, using at least one receiving device (which can be a receiver or the transceiver 140, 240), the at least one output signal;

reading, using at least one controller (which can be controller 110, 210, 310), the at least one position value from the output signal; and comparing, using at least one controller, the at least one position value with at least one predetermined value in order to determine if a control action is required, the control action being transmitting a control signal to at least one stimulus device that causes the at least one stimulus device to administer at least one form of stimulus to the animal in order to control the animal.

In one embodiment, from a result of comparison if it is determined that a control action is required, the method further comprises a step of:

transmitting, using the at least one transmitting device (which can be a transmitter or a transceiver 140, 240), the control signal to at least one stimulus device thereby causing the at least one stimulus device to administer at least one form of stimulus to the animal in order to control the animal.

The step of transmitting the control signal to the at least one stimulus device may occur if the at least one position value either exceeds or substantially exceeds or is below or is substantially below the at least one pre-determined value.

The step of transmitting the control signal to the at least one stimulus device may occur until it is determined that the at least one position value is same or substantially the same as the at least one predetermined value.

If it is determined that the at least one position value is same or substantially the same as the at least one predetermined value no form of stimulus may be administered to the animal.

It is determined that the at least one position value is same or substantially the same as the at least one predetermined value, the at least one sensing device continues to detect at least one position of at least part of the animal as at least one position value, the at least one transmitting device continues to transmit the at least one position value in a form of at least one output signal; the at least one receiving device continues to receive the at least one output signal, the at least at least one controller continues to read the at least one position value from the output signal and compare the at least one position value with at least one predetermined value in order to determine if the control action is required.

The step of determining if the control action is required can be performed by the controller.

The step of determining if the control action is required can be performed using a remote processor that is operatively connected to the controller.

The step of determining if the control action is required can be performed using a user device that is operatively connected to the controller.

The at least one stimulus is in the form of at least one of a sound, a vibration and an electric shock. The at least one of the sound and/or the vibration can be administered by the at least one stimulus device before applying the electric shock. The sound and/or vibration may be variable in strength and/or frequency. The electric shock may also be variable in magnitude.

It can be appreciated that the method can be used for controlling the position of an animal and/or position of an animal to help guide the animal towards a particular position or path and/or controlling the position of an animal to help guide the animal at a particular position or path.

It can also be appreciated that the method can be used for controlling the heading and/or course to help guide the animal towards a particular position or path.

Figure 10:
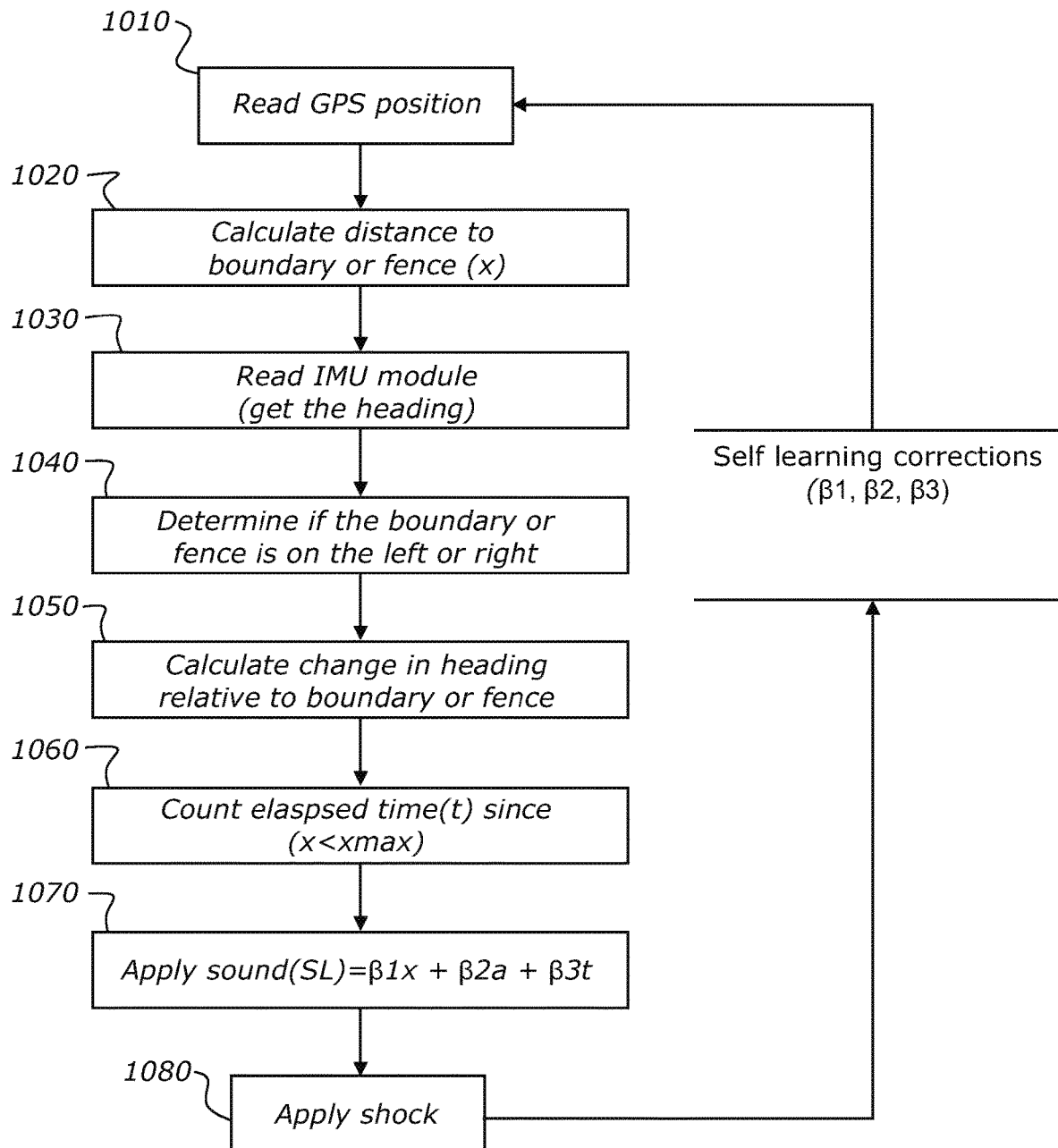
FIG. 10 is a flowchart showing one other example of a method for controlling, recording and/or monitoring the positions of an animal.

FIG. 10 is a flowchart showing one other example of a method for controlling the position(s) of an animal.

The first step 1010 involves reading GPS position.

The second step 1020 involves calculating distance to the boundary or fence, the distance being x.

The third step 1030 involves reading angular position using a sensing device, which in this example is IMU.

The fourth step 1040 involves determining if the boundary is on the left or the right.

The fifth step 1050 involves calculating change in heading relative to the boundary.

The sixth step 1060 involves counting elapsed time (t) since x<xmax, the xmax being the maximum distance to the boundary or fence.

The seventh step 1070 involves applying sound level (SL) between 0% to 100% using the equation $SL = \beta_1 x + \beta_2 a + \beta_3 t$ where, $\beta_1$, $\beta_2$ and $\beta_3$ are gains (distance gain, heading gain, and time gain, respectively) which are tuned or adjusted per cow, x is the distance to the boundary or fence, t is the elapsed time since $x<x_{max}$, the $x_{max}$ being the maximum distance to the boundary or fence, and a is delta heading (so heading after entering the boundary (which can be positive and negative), If SL=1, then ninth step occurs, which is basically applying of electric shock to the animal. The shock is preferably applied to the side that is closest to the boundary or fence. Similarly, if SL<1, then the first step 1010 occurs.

It will of course be realised that while the foregoing has been given by way of illustrative example of the present invention, all such modifications and variations thereto as would be apparent to a person skilled in the art are deemed to fall within the broad scope and ambit of this invention as is hereinbefore described.

The sensing device may even be in a form of a device that is not physically connected to the animal or carried/worn by the animal, and could instead be located in a distance from the animal but yet could yet detect the position of the animal from a distance by using radiations, laser, optical beams, magnetic fields, soundwaves etc. Reflective sensors, infrared sensors, ultrasonic sensors are some of the examples of the sensing device.

Instead of a collar 300, many other forms that are suitable to be worn by an animal may be used with the apparatus of the present invention, such as but not limited to animal clothing, wearable straps, saddles etc.

In the description with reference to FIG. 9, it is mentioned that the first and/or second form of stimulus may possibly be administered from left side, right side and/or both the side of the cow. However, it may be possible that the first and/or second form stimulus is/are applied to the cow from the top and/or bottom.

Although, not shown, the apparatus 100, 200 or collar 300 of the present invention may comprise radio or use a radio signal in order to report status or the apparatus and/or collar and or to update new boundary and/or other parameters.

LoRaWAN may optionally be used for such purpose. LoRaWAN is a media access control (MAC) protocol for wide area networks. It is designed to allow low-powered devices to communicate with Internet-connected applications over long range wireless connections.

Further Advantages

Following are some of the advantages that the present invention may individually or selective from two or more advantages may achieve:

The present invention may provide indication of whether the subject animal has responded desirably to the stimuli.

The present invention may provide means for continuously monitoring how a particular animal is behaving especially when the animal is not walking or is within a particular spot of the confined area, and applying the control action accordingly.

The present invention may provide means for training an animal to remain within a confined area and graze well within the confined area.

The present invention may allow remote or automated self-control of the invention to help control the animals.

The invention claimed is:

1. An apparatus for controlling animal or animal positions along a course, the animal being a livestock animal, the apparatus comprising:

a housing in a form of an animal collar configured to be worn around the neck of the animal, the collar at least partially housing a stimulus device inside the collar, the housing carrying:

at least one angular position sensing device configured to detect at least one angular position of at least part of the animal relative the course as at least one position value; and at least one controller that is operatively connected to the at least one angular position sensing device, and programmed to read and compare the at least one angular position value with at least one predetermined value relating to the at least one angular position, for determining if a control action is required to correct at least one angular position of the animal to follow the course, the control action being transmitting a control signal to the stimulus device thereby causing the stimulus device to administer at least one form of stimulus selected from a first stimulus and a second stimulus to the animal, wherein the stimulus device comprises two speakers that are configured to apply the first stimulus, one speaker being on a left side of the collar proximal to the animal's left ear, and the other speaker being on a right side of the collar proximal the animal's right ear, and the first stimulus is a sound that is generated by at least one of the two speakers, the sound being audible to the animal, wherein if it is determined that the control action is required, the at least one controller is configured to send the control signal to administer the first stimulus from one of the two speakers for guiding the animal along the course, wherein the at least one position sensing device comprises an inertial measurement unit to provide information of the at least one angular position value to the controller and providing an indication that a movement of the collar is in a left and a right direction to indicate that the animal is turning its head to either the left or the right direction, and the controller is adapted to increase or decrease a volume of the sound by applying the volume of the sound at a sound level (SL) between 0% to 100% using the equation $SL=B1x+B2a+B3t$, where B1, B2, and B3 are distance gain, heading gain and time gain respectively; x is a distance to a boundary; a is the change in heading off-course, or a heading of the animal after crossing the boundary; and t is an elapsed time since the animal was off course or elapsed time after crossing the boundary, wherein the stimulus device further comprises at least one electrode that is configured to apply the second stimulus, the second stimulus being an electric shock that is generated by the at least one electrode, and wherein if the animal has not corrected its course after the SL is 100%, the controller is configured to send a further control signal to the stimulus device to apply the second stimulus to the animal.

2. The apparatus as claimed in claim 1, wherein the housing comprises or attaches at least one transmitting device adapted to transmit the at least one angular position value from the at least one angular position sensing device to the at least one controller, and to transmit the control signal to the at least one stimulus device if the at least one controller determines or receives a control command that the control action is required.

3. The apparatus as claimed in claim 1, wherein the housing comprises or attaches a memory for storing the at least one predetermined value relating to the at least one angular position.

4. The apparatus as claimed in claim 1, wherein the at least one angular position is measured in three orthogonal directions, the three orthogonal directions being roll, pitch and yaw.

5. The apparatus as claimed in claim 1, wherein the at least one angular position comprises an angular position of the head and neck of the animal, the angular position of the head and neck of the animal is measured in three orthogonal directions, the three orthogonal directions being roll, pitch and yaw.

6. The apparatus as claimed in claim 1, wherein the housing comprises or attaches at least one navigation means that is operatively connected with the at least one controller, the at least one navigation means is configured to determine a location of the animal as an at least one location value and transmit a signal representing the at least one location value to the at least one controller.

7. The apparatus as claimed in claim 6, wherein the at least one navigation means is or uses a Global Positioning System (GPS) or a Local Positioning System (LPS).

8. The apparatus as claimed in claim 6, wherein the at least one navigation means is or uses a Global Positioning System (GPS) and the at least one position value is made up of at least two GPS co-ordinates.

9. The apparatus as claimed in claim 1, wherein the at least one angular position is the at least one angular position relative to a course datum or relative to at least read the at least one angular position or the at least one angular position value relating to the at least one angular position.

10. The apparatus as claimed in claim 1, wherein the at least one angular position is the at least one angular position relative to a horizontal plane.

11. The apparatus as claimed in claim 1, wherein the at least one angular position is an at least one angular heading of the animal.

12. The apparatus as claimed in claim 1, wherein the apparatus is further configured to calculate a change in heading of the animal relative to a boundary.

13. A method for controlling a position of a livestock animal, the method comprising:

providing a collar configured to be secured around a neck of the livestock animal, the collar comprising:
a stimulus device for applying a first stimulus and a second stimulus, the stimulus device comprising two speakers that are configured to apply the first stimulus, one speaker being on a left side of the collar proximal to the animal's left ear, and the other speaker being on a right side of the collar proximal the animal's right ear, and the first stimulus is a sound that is generated by at least one of the two speakers, the sound being audible to the animal, the stimulus device further comprising at least one electrode that is configured to apply the second stimulus,
an angular position sensing device configured to detect at least one angular position of the neck of the livestock animal,
a memory device, and
a controller in electronic communication with the stimulus device, the angular position sensing device, and the memory device;

measuring, employing the angular position sensing device, a first angular position of the neck of the livestock animal;

storing, in the memory device, the first angular position as a predetermined value;

measuring, employing the angular position sensing device, a measured angular position value of the livestock animal;

determining, by the controller, whether the measured angular position value indicates that the livestock animal is following a course by comparing the measured angular position value of the livestock animal with the predetermined value;

determining, by the controller, if a control action is required, the control action being transmitting a control signal to the stimulus device thereby causing the stimulus device to apply at least one form of stimulus selected from the first stimulus and the second stimulus to the livestock animal, wherein to apply the at least one form of stimulus, the controller is configured to:
calculate a sound level (SL) between 0% to 100% using the equation $SL=\beta_1 x+\beta_2 a+\beta_3 t$, where $\beta_1$, $\beta_2$ and $\beta_3$ are distance gain, heading gain and time gain respectively; x is a distance to a boundary; a is the change in heading off-course, or a heading of the livestock animal after crossing the boundary; and t is an elapsed time since the livestock animal was off course or elapsed time after crossing the boundary, and
increase or decrease a volume of the sound from the two speakers dependent on the calculated sound level, and
if the livestock animal has not corrected its course after the SL is 100%, send a further control signal to the stimulus device to apply the second stimulus to the livestock animal.

14. A method for controlling a position of a livestock animal comprising:
providing a collar configured to be secured around a neck of the livestock animal, the collar comprising:
a stimulus device for applying a first stimulus and a second stimulus, wherein: the stimulus device comprises two speakers that are configured to apply the first stimulus, an angular position sensing device configured to detect at least one angular position of the neck of the livestock animal,
a memory device, and
a controller in electronic communication with the stimulus device, the angular position sensing device, and the memory device;
measuring, employing the angular position sensing device, a first angular position of the neck of the livestock animal;
storing, in the memory device, the first angular position as a predetermined value;
measuring, employing the angular position sensing device, a measured angular position value of the livestock animal;
determining, by the controller, whether the measured angular position value indicates that the livestock animal is not grazing properly by comparing the measured angular position value of the livestock animal with the predetermining value;
applying, by the stimulus device, at least one form of stimulus selected from the first stimulus and the second stimulus to the livestock animal; and,
calculating, by the controller, the volume of sound from the two speakers at a sound level (SL) between 0% to 100% using the equation $SL=B1x+B2a+B3t$, where B1, B2 and B3 are distance gain, heading gain and time gain respectively; x is a distance to a boundary; a is the change in heading off-course, or a heading of the livestock animal after crossing the boundary; and t is an elapsed time since the livestock animal was off course or elapsed time after crossing the boundary.

15. The method for controlling a position of a livestock animal as claimed in claim 14, wherein:
the two speakers comprise one speaker being on a left side of the collar proximal to the livestock animal's left ear, and the other speaker being on a right side of the collar proximal the livestock animal's right ear, and the first stimulus is a sound that is generated by at least one of the two speakers, the sound being audible to the livestock animal, wherein if it is determined that a control action is required, the at least one controller is configured to send the control signal to apply the first stimulus from one of the two speakers for guiding the livestock animal along a course, and,
the stimulus device further comprises at least one electrode that is configured to apply the second stimulus.

\* \* \* \* \*